United States Patent Office 3,450,525
Patented June 17, 1969

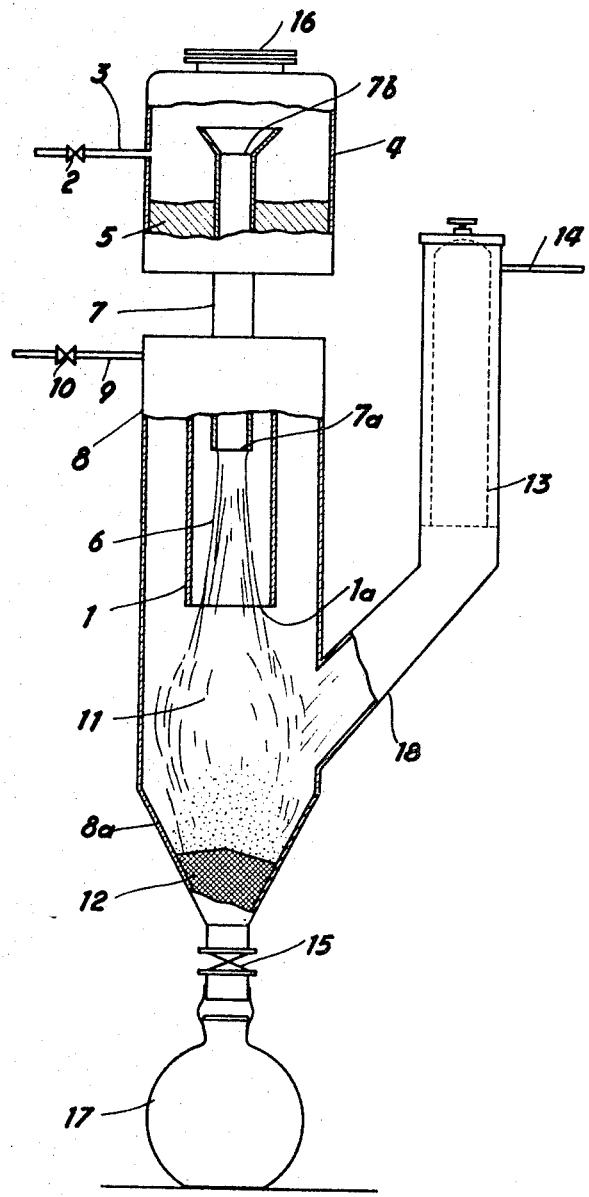

3,450,525
POWDERED METALS
Antoine Van Den Steen, Crolles, France, assignor, by mesne assignments, to Ugine Kuhlmann (Société Anonyme), Paris, France, a corporation of France
Filed Dec. 29, 1966, Ser. No. 605,819
Claims priority, application France, Dec. 31, 1965, 44,527
Int. Cl. C22b 5/12; B22f 9/00
U.S. Cl. 75—84.5
18 Claims

ABSTRACT OF THE DISCLOSURE

A process is provided for the production of exceptionally high yields of metal powders of high purity by the direct hydrogen reduction of metal halides of metals of Groups IV, Va, VIa, VIIa, iron, cobalt or nickel or combinations thereof wherein the reduction is induced by flowing a reactive mixture of hydrogen and at least one metal halide through a reaction zone surrounded by at least one wall which is preheated to a temperature which is (1) above the reaction temperature for the reactive mixture and (2) a temperature at which the formed metal does not adhere to the walls surrounding the reaction zone.

---

The invention relates to a process for the preparation of powdered metals of high purity, of metallic compounds, of composite metallic powders, by reduction of the corresponding metal halides, particularly by means of hydrogen.

Processes for the preparation of metals by reduction of their halides have already been proposed, particularly for iron, cobalt, nickel, vanadium, niobium, tantalum, chromium, molybdenum, tungsten, rhenium, etc. . . . In the previously known processes, the metal halide is generally treated with hydrogen in an enclosure heated to the reaction temperature in which case the metal thus obtained deposits on the walls of said enclosure or of a reaction zone.

When the metal deposits on the wall of the enclosure itself, the reaction product is collected by scaling in the hydride state as described in French Patent No. 1,241,469, dated Nov. 23, 1959. The metal may also be deposited on the particle surface of a fluidized bed, as described by French Patent No. 1,190,581, dated Nov. 14, 1957, or may be obtained in a stream of hydrogen and plasma, as described in French Patent No. 1,339,148, dated Nov. 8, 1962.

In certain other previously known processes, such as those described in French Patent No. 1,313,159, dated Nov. 8, 1961 and in the first patent of addition to said Patent No. 81,625, dated May 2, 1962, as well as in French Patent No. 1,325,939, dated May 8, 1962, a gaseous sheath which is concentric with respect to the walls of the reactor maintains the reagents and reaction products separated from the walls of the reactor. In general, such a sheath is formed by the reducing gas itself—or a mixture of gas containing it—previously raised to the reaction temperature. These processes provide a metallic powder containing a certain quantity of residual halogen, most often chlorine, which in numerous cases, involves disadvantages.

In order to further illustrate the previous state of the art, it may be noted that German Patent No. 903,034, dated Aug. 9, 1951, mentions that it is possible to eliminate chlorine in chlorinated niobium by heating under vacuum at a temperature in the neighbourhood of 1400° C.

The processes of the previous art involve disadvantages. The metal or metallic hydride deposit on a fixed wall requires scaling and causes a discontinuous functioning of the operation. The other known processes involve the disadvantage of having to use large quantities of reducing gas or gaseous mixtures containing it, whose function it is to ensure reduction and also fluidization, the formation of a plasma or the formation of a sheath which maintains the products separated from the walls.

The present invention eliminates the disadvantages of the known processes and its essential object is a process for obtaining economically and in a continuous manner, powdered metals, or mixtures of metals, in powdered form or in the form of alloys, from metallic halides that are reducible by hydrogen.

Generally, the process of the invention consists in contacting, in a reaction zone, a mixture of at least one metallic halide and of a reducing gas, such as hydrogen, with at least one wall raised to a temperature that is higher than the reaction temperature of said mixture and such that the metallic powder that is formed does not adhere to said wall.

More specifically, the process of the invention for obtaining metallic powders by direct reduction in the gaseous or condensed phase, by means of hydrogen, from the corresponding metal halides, is characterized in that a reactive gaseous mixture is formed containing hydrogen and at least one halide of metal chosen from metals in Group IV, Va, VIa, VIIa of the periodic classification, iron, cobalt and nickel, in that, said reactive gaseous mixture is contacted in a reaction zone with at least one wall raised to a temperature that is higher than the reaction temperature of said mixture, the metallic powder that is formed by reaction not adhering to said wall under the reaction conditions, and in that said metallic powder is separated in a cooled zone that is adjacent to said reaction zone, from the by-products of the reaction.

In the process of the invention, metallic halides among others that are reducible by hydrogen are used such as titanium, tin, vanadium, niobium, molybdenum, tungsten, chromium, uranium, iron, cobalt, and nickel halides.

In practice, the corresponding chlorides are preferably used as metallic halogens.

The wall temperature used according to the invention in the reaction zone varies as a function of the metal halides subjected to reduction. Good results are obtained by operating at a wall temperature at least equal to 1600° C. for metals whose melting temperature is higher. For metals whose melting point is below 1600° C., the wall temperature will be chosen at a value that is at least equal to the melting temperature.

Thus according to the invention, in order to obtain niobium powder in a continuous manner by reduction of niobium pentachloride by hydrogen in the gaseous phase the reduction is carried out in a reaction enclosure heated to a temperature that is at least equal to 1600° C., particularly in a reactor made of niobium, and the niobium powder formed is separated from the by-products of the reaction in a cooled consecutive zone.

Similarly, in order to obtain vanadium powder in a continuous manner by reduction of vanadium tetrachloride in the gaseous phase by hydrogen, the reduction is carried out according to the invention in a reaction enclosure heated to a temperature that is at least equal to 1600° C., particularly in a reactor made of molybdenum, and the vanadium powder formed is separated from the by-products of the reaction in a cooled consecutive zone.

The metallic powders that may be obtained using the invention exhibit a certain residual halogen content, particularly chlorine. The quantity of this chlorine content, as well as the diameter of the separated particles, depends on the reduction conditions and particularly on the temperature and on the shape of the reaction enclosure, on the partial pressures and on the flow rate of the gaseous constituents of the reaction.

The metallic powder obtained by the invention is particularly indicated for uses requiring a minimum mesh, while at the same time allowing a small residual chlorine content. If a powder that is appreciably exempt from chlorine is desired, it is possible either to recycle it or to raise it rapidly, with or without intermediate compression, to a temperature above 1000° C. in an inert gas, or hydrogen atmosphere or under vacuum.

Elimination of halogen, particularly chlorine constitutes a complementary step in the reduction of the metallic halide, carried out according to the invention. The treatment of halogenated metals under vacuum at high temperature has already been proposed. The invention however requires an additional important precaution, namely that the elimination of halogen in the halogenated metal powder must be carried out at a very high rate of temperature increase, which is above or equal to 70° C. per minute. It is important indeed that the speed of reduction be higher than the sintering speed. This latter observation is all the more important in that the powder that is obtained during the first reduction step possesses a characteristic aptitude which causes it to be sintered easily at low temperatures. Under these conditions, a slow increase in temperature leads to the fixation of traces of halogen in the metal and their elimination then requires a temperature in the neighbourhood of that of fusion.

Therefore, if it is required to eliminate the totality of the chlorine, the metallic powder as such or after having undergone a densification by compacting or any other means, may be brought in a continuous manner to a conventional type or oven, under vacuum or under an inert gas or reducing atmosphere, ensuring a rate of temperature rise that is equal to or above 70° C. per minute or that is already raised to a temperature equal to or above 1000° C. using an appropriate means of heating. A slight sintering begins during this operation. According to the use for which the metal thus obtained is designed, it is possible by acting on the cooling program, to prepare either a very crumbly hydride which by crushing provides a powder of definite mesh or a metal which contains only very little hydrogen and is capable of directly feeding a fusion oven. As previously mentioned, it is also possible to eliminate chlorine from the metallic powder obtained by reduction by recycling the latter in the reduction zone.

In order to carry out the invention pure hydrogen or hydrogen diluted in a gas that is inert with respect to the reduction products is preferably used as a reducing agent. In the case where the hydrogen used is not pure, especially if it contains nitrogen, carbon monoxide, oxygen, combustible hydrocarbons such as propane, boranes or other reactive gases, for example in the case where hydrogen is obtained from the decomposition of ammonia, a metallic powder is obtained which, to a certain extent, contains compounds such as oxides, nitrides, carbides or others, resulting from the reaction of the metal in the halide with the hydrogen impurities. This method of using the invention may be advantageous in all cases where it is preferred to obtain composite metallic powders. The reactive gaseous compound content of the main reducing agent, hydrogen, makes it possible to regulate the final quantity of solid compounds included in the metallic powder obtained and containing said elements. It is possible to produce niobium nitride simultaneously with niobium, in the case where the hydrogen used for the reduction contains nitrogen.

The reduction according to the invention is carried out in the vapour phase between at least one metallic halide, such as niobium pentachloride or vanadium tetrachloride, and hydrogen. However the metallic halide can also be put to use directly in dust form instead of being transformed into vapour in a previous zone before being introduced into the reaction zone. It is advantageous, but not indispensable to preheat the hydrogen before introducing it into the reaction zone. Preheating temperatures of the order of 250° C. are adequate for example, for carrying the niobium pentachloride vapours.

The reaction zone may consist of an enclosure made of a refractory material that is inert with respect to the reaction constituents. According to an advantageous mode of execution, the reaction zone is made of a material that is identical with the metal produced. The reaction zone is for example a cylindrical reactor made of niobium or molybdenum, that is heated electrically or by other means.

The process of the invention may also be applied to the reduction of a mixture of metallic halides, with a view to producing compounds or alloys of binary, ternary or other systems. Thus, it is possible for example to simultaneously subject niobium pentachloride and vanadium trichloride to reduction in order to obtain binary compounds such as NbV.

A particular application of the invention consists in adding halides that are reducible by hydrogen, to niobium or vanadium halides, in order to provide metallic powder mixtures or semimetallic or intermetallic combinations of the type exhibiting super-conducting properties such as $Nb_3Sn$, $V_3Ga$, $V_3Si$ etc. . . .

The simultaneous introduction of refractory powders, oxides, nitrides, carbides, etc. . . . or metallic powders, preferably pre-heated between 600 and 800° C. and of reducible metallic halides, makes it possible to deposit the reduced element onto the surface of the powders and to obtain their coating as a result. Thus it is possible simultaneously to introduce uranium dioxide dust and a mixture of niobium pentachloride and hydrogen vapours in order to obtain $UO_2$ powders coated with niobium.

A device for carrying out the process to the invention consists of a closed vaporization apparatus provided with necks for the introduction of hydrogen and of the metallic halides, with means for injection communicating with the vapour space of the vaporization apparatus and with an opening in the neighborhood of a closed enclosure of general cylindrical shape, arranged vertically of a cylinder made of refractory material, raised to a temerature at least equal to 1600° C. by heating means and extending from the tip of the enclosure and surrounding the extremity of said means of injection and extending into said enclosure beyond said extremity, the enclosure ending at its lower extremity by a conical part provided with a valve, for the purpose of collecting the metallic powder that is formed, and of at least one neck cut onto the enclosure at a level located between the lower extremity of the refractory tube and the conical part of the enclosure, said neck being provided with means for the evacuation of the gases and with means for the filtration of the metallic particles that are carried out of the enclosure.

The enclosure may consist in its upper part of a neck for the introduction of additional hydrogen into the reaction zone.

A device of the above type is shown by way of illustration, as an axial schematic section in the figure of the attached drawing.

In the device shown in the drawing, the reaction zone 6 proper is located inside a tube 1, for example made of niobium or molybdenum, which is raised to a temperature at least equal to 1600° C. by an electric heating apparatus (not shown in the drawing). Tube 1 is attached to the top of a vertical enclosure 8. An injector 7 penetrates into the interior of enclosure 8 and of tube 1. The lower extremely 7a of the injector emerges above the lower extremity 1a of tube 1. A vaporization apparatus 4 is located above enclosure 8. It is provided with inlet 3 for the introduction of hydrogen through a regulating valve 2. The metallic halide, for example niobium pentachloride or vanadium tetrachloride, is placed at 5 in vaporiser 4 and may be introduced at 16. Flange 16 shown in the drawing is advantageously replaced by a constant output powder feeding device, especially the one described in French Patent No. 1,334,420, dated June 25, 1962, in the case in which it is desired to introduce halides in the form of a dust or refractory powders into the reaction zone.

An inlet 9, provided with a valve 10 makes it possible to introduce a possible additional quantity of hydrogen known as "dilution hydrogen," into the upper part of enclosure 8.

The powder produced in the course of the reaction is entrained by the gaseous current into a cooling zone 11 where it separates by gravity. The lower part 8a of enclosure 8 is conical. The powder formed then assembles at 12. The fraction that has not decanted after zone 11 is separated from the gases in a lateral inlet 18 consisting of a filtering sleeve 13 and returns to 12. The gases are evacuated at 14. A valve 15 placed at the foot of conical part 8a of enclosure 8 makes it possible to withdraw the formed and collected powder into a container 17 that is tightly connected to valve 15 and to enclosure.

It should be noted that the device under consideration constitutes a simple example for putting the invention into operation. Indeed, it might be possible to use other reactors whether or not they are cylindrical that would be placed obliquely or horizontally, or still to introduce a wall in accordance with the conditions of the invention in the reaction zone of a known apparatus in order to avoid all types of deposits.

The following examples illustrate without any limitation whatsoever the putting into operation of the invention using the device that has just been descirbed.

EXAMPLE I 596 g. of noibium pentachloride were charged into the vaporization apparatus 4 and it was vaporized at the rate of 190 g./hour.

The vapors were entrained by a purified hydrogen steam that was preheated to 250° C. The total purified hydrogen flow rate was 700 liters/hour distributed as follows:

350 liters of carrier hydrogen (at 3), and
350 liters of diluted hydrogen (at 9).

Reactor 1 was made of niobium and raised to 1700° C. by a high frequency induction heating device.

66.6 g./hour of niobium powder were collected containing 2.34% of chlorine and less than 50 p.p.m. of oxygen, of carbon and nitrogen.

The average diameter of the particles, as determined under the electron microscope was several tenths of a micron.

The niobium yield was 99.6%.

50 g. of this powder were taken and heated at 1200° C. under a stream of hydrogen.

The rise in temperature was effected in 30 minutes and the powder was maintained at 1200° C. for 10 minutes.

Cooling was effected at the rate of 150° C. hour under a 50 liters/hour stream of hydrogen.

A very crumbly agglomerate of hydrogenated niobium that was completely free of chlorine was collected.

A niobium powder having an average diameter of several microns was prepared by crushing and degassing under vacuum.

EXAMPLE II 275 g. of niobium pentachloride were charged into the evaporator and 46 g./hour of vapor were carried by a flow of 300 liters/hour of hydrogen that was preheated to 250° C.

The hydrogen employed was obtained by decomposition of ammonia gas and was only partially purified. The niobium yield was 91%.

15.35 g./hour of powder was collected showing the following analysis:

| | Percent |
|---|---|
| Chlorine | 1.76 |
| Carbon | 0.04 |
| Oxygen | 0.09 |
| Nitrogen | 3.80 |

The entire quantity of nitrogen contained in the hydrogen in elemental or compound form, became attached to the niobium powder niobium nitride.

EXAMPLE III 348 g. of powdered niobium pentachloride obtained by crushing the melted pentachloride in an inert atmosphere were charged into a feeding hopper replacing vaporizer 4 and connected to flange 16.

The feeding velocity of $NbCl_5$ powder was set at 136 g./hour. The purified hydrogen flow rate was set at 300 liters/hour by acting on valve 2. The operation was carried at 9 without diluted hydrogen.

Niobium reactor 1 was a cylinder having a diameter of 32 mm. and a length of 100 mm., heated at 1650° C. by high frequency induction.

50 g./hour of niobium powder containing 6.74% of chlorine were collected. The niobium was 99.7%.

EXAMPLE IV 363 g. of niobium pentachloride were introduced into vaporizer 4 and the vapors were entrained at the rate of 110 g./hour in a 600 liter/hour purified gas stream that was preheated to 250° C.

37.7 g./hour of powder were collected containing 1.4% of chlorine. The niobium yield was 98.3%. The average diameter of the particles as determined under the electron miscroscope was several tenths of a micron. The dilution of the halide vapors in the reducing gases made it possible to obtain very fine and very reactive powders.

EXAMPLE V 84 g. of vanadium tetrachloride were introduced into vaporizer 4 and 21 g./hour of said chloride were entrained. The hydrogen flow rate was 300 liters/hour.

Reactor 1 made of molybdenum had the same dimensions as the one in Example III and raised to 1600° C.

6.0 g./hour of metallic powder were collected containing 10.0% of chlorine.

The vanadium yield was 97.3%.

EXAMPLE VI 211 g. of vanadium trichloride were charged into a feeding hopper that replaced vaporization device 4 and that was connected to flange 16.

The feeding velocity of $VCl_3$ powder was set at 65 g./hour and the total hydrogen flow rate at 1500 liters/hour.

Reactor 1 was made of molybdenum and was raised to 1600° C.

29.5 g./hour of powder were collected containing 28.7γ of chlorine.

This powder was recharged into the feeding hopper and the operation was repeated under the same conditions. The recycling was effected 3 times.

A vanadium powder was finally collected which now contained only 0.55% of chlorine.

The overall yield of vanadium was 98.5%.

EXAMPLE VII 247 g. of chromium trichloride were charged into the feeding hopper described in Example III.

The feeding velocity of $CrCl_3$ powder was set at 164 g./hour and the hydrogen flow rate at 1500 liters/hour.

Reactor 1 was the same as in the preceding example.

The powder that was collected contained 38.33% of chlorine.

After two recycling operations such as were described in Example II, the powder now contained only 6.64% of chlorine.

The yield of the operation was 95%.

EXAMPLE VIII

An intimate mixture of 200 g. of uranium dioxide powder and 60 g. of niobium pentachloride powder were charged into the feeding hopper described above.

The feeding velocity of the mixture was set at 260 g./hour and the hydrogen flow rate at 1500 liters/hour.

A powder containing 0.92% of chlorine was collected.

Examination of this powder under the optical microscope shows that the metallic niboium obtained by reduction of its pentachloride has deposited as a thin and regular layer on the surface of the $UO_2$ grains.

This example is particularly significant. Indeed, the uranium dioxide powder which rapidly crosses the reaction zone is heated by radiation from reactor wall.

However the temperature of the latter does not reach the threshold above which niobium no longer deposits, which on the other hand is the case for the reactor wall raised to 1600° C.

EXAMPLE IX

A quantity of 185 g. of tungsten hexachloride was charged into the feeding hopper and introduced into the reaction zone over a 1 hour period.

The hydrogen flow rate was set at 1500 liters/hour.

The reactor was made of a molybdenum sheet heated to 1700° C.

A tungsten powder was collected containing 19.56% of chlorine.

This powder was recharged into the feeding hopper and recycled under the same conditions as above.

However, 2.5 litres per hour of propane were mixed with 1500 litres/hour of hydrogen.

A very fine powder was collected whose chlorine content was 1.69% and whose X-ray diffraction spectrum showed to be tungsten carbide WC.

This result shows the very great reactivity of the powder as prepared by reduction of the halides by hydrogen under the conditions of the process of the invention.

EXAMPLE X

Titanium tetrachloride was vaporized at the rate of 84 g./hour and the vapors were entrained into the reaction zone by a 150 litres/hour hydrogen stream.

A flow of hydrogen of 1500 liters/hour on the other hand was introduced into the enclosure through inlet 9.

The wall setting of the reaction zone was heated to 1600° C.

A brown black powder was collected that contained 60% of chlorine corresponding therefore to titanium dichloride.

Recycling of the latter component by means of the powder feeding device under the same reduction conditions, i.e., hydrogen flow rate of 1500 litres/hour and reactor wall at 1600° C., gave a powder which now contained only 33.46% of chlorine.

The yield of the operation was 98%.

EXAMPLE XI 140 g. of tin tetra chloride were vaporized in one hour and were then entrained into the reaction zone by 150 litres of hydrogen.

1500 litres of hydrogen were introduced through inlet 9.

The reactor was made of a rolled molybdenum sheet that was heated to 1600° C.

The chlorine content which was 54.45% in the starting product fell to 22.28%.

The yield of the operation was 96%.

The product that was collected was in the form of a very fine white powder which is particularly valuable for the preparation of mixtures with other metallic chloride dusts such as niobium pentachloride "snow."

The simultaneous reduction of such a mixture in definite proportions makes it possible to prepare powders by subsequent reduction having the formula $Nb_3Sn$ whose superconducting properties are well known.

EXAMPLE XII

A quantity of 186 g. of nickel (II) chloride was charged into the feeding hopper and introduced into the reaction zone over a 1 hour period.

The hydrogen flow rate was set at 1500 litres/hour.

The reactor wall was heated to 1450° C.

A nickel powder was collected containing 13.95% of chlorine.

This powder was recharged into the feeding hopper, and recycled in 30 minutes under the same condiitons.

The powder that was collected now contained only 4.68% of chlorine.

The yield of the operation was 99.2%.

In all cases, use of purified hydrogen as a reducing agent leads to metallic powders that contain less than 50 p.p.m. of oxygen, of carbon and of nitrogen.

I claim:

1. In a process for the production of powdered metals by direct reduction of halides of said metals in the vapor or condensed phase with hydrogen, the steps of:
   (a) forming a reactive gaseous mixture containing hydrogen and at least one metal halide of a metal chosen from the metals in Groups IV, Va, VIa, VIIa, iron, cobalt and nickel in a first zone at a temperature below the reaction temperature thereof,
   (b) providing a second zone for reaction of the mixture, said zone being surrounded by at least one wall maintained at a temperature above the reaction temperature of said reactive mixture at which said metal does not adhere to said walls,
   (c) flowing a stream of said reactive gaseous mixture through said second zone at a speed at which said reaction temperature is reached and said metal halide is reduced to metal powder, and
   (d) thereafter cooling the outflowing gaseous stream in a third zone to separate the metal powder from the by-products of the reaction.

2. Process according to claim 1 in which said metal halides that are reducible by hydrogen are chlorides of said metals.

3. Process according to claim 1 in which said metal possesses a melting point that is below approximately 1600° C., in which case the temperature of said wall is at least equal to said melting temperature.

4. Process according to claim 1 in which said metal possesses a melting point higher than to approximately 1600° C. and the temperature of said wall is at least equal to approximately 1600° C.

5. Process according to claim 1 including the additional step of elimination of halides traces in said metallic powder consisting in heating said metallic powder under gaseous atmospheric conditions selected from the group consisting of a hydrogen atmosphere, inert gases and vacuum, the reheating velocity of said powder being at least equal to 70° C. per minute and the final heating temperature being at least equal to 1000° C.

6. Process according to claim 1 in which said metal halide is introduced in solid form into said reaction zone.

7. Process according to claim 1 in which said metal halide is introduced in gaseous form into said reaction zone.

8. Process according to claim 1 in which hydrogen is introduced in a state that is substantially pure into said reaction zone.

9. Process according to claim 1 in which hydrogen is introduced in diluted form with at least one inert gas into said reaction zone.

10. Process according to claim 1 in which hydrogen is introduced into said reaction zone in the gaseous state with at least one gas capable of reacting with said metal halides under reaction conditions.

11. Process according to claim 1 in which hydrogen is introduced into said reaction zone in the gaseous state with at least one reactive gas chosen from oxygen, steam, nitrogen, propane and boranes.

12. Process according to claim 1, including the additional step of preheating the hydrogen before introduction into said reaction zone.

13. Process according to claim 1 including the step of additionally introducing a stream of dilution hydrogen into said reaction zone.

14. Process according to claim 1 in which a plurality of metal halides are introduced into said reaction zone.

15. Process according to claim 1 in which refractory compounds in dust form, and preheated between 600° C. and 800° C. with said metal halides reducible by hydrogen, are introduced into said reaction zone.

16. Process according to claim 1 in which additional powdered metals that are preheated between 600° C. and 800° C. are introduced into the reaction zone with said metal halides reducible by hydrogen.

17. A process for obtaining niobium powder in a continuous manner by reduction of niobium pentachloride in the vapor phase by hydrogen, comprising the steps of:
  (a) forming a gaseous mixture of hydrogen and niobium pentachloride in a first zone,
  (b) containing said gaseous mixture in a second zone for reaction, said zone being surrounded by at least one wall maintained at a temperature that is at least equal to 1600° C.,
  (c) and separating said niobium powder in a cooling third zone adjacent to said reaction zone.

18. A process for obtaining vanadium powder in a continuous manner, by reduction with hydrogen of vanadium trichloride in the vapor phase, comprising the steps of:
  (a) forming a gaseous mixture of hydrogen and vanadium trichloride in a first zone,
  (b) contacting said gaseous mixture in a second zone for reaction, said zone being surrounded by at least one wall maintained at a temperature that is at least equal to 1600° C.,
  (c) and separating said vanadium powder in a cooling third zone adjacent to said reaction zone.

References Cited
UNITED STATES PATENTS

| | | | |
|---|---|---|---|
| 2,663,633 | 12/1953 | Crowley et al. | 75—0.5 X |
| 2,701,761 | 2/1955 | Crowley | 75—34 |
| 2,762,700 | 9/1956 | Brooks | 75—0.5 |
| 3,320,145 | 5/1967 | Case | 75—84.4 X |
| 3,230,077 | 1/1966 | Hiller | 75—84.5 |

CARL D. QUARFORTH, *Primary Examiner.*

M. J. SCOLNICK, *Assistant Examiner.*

U.S. Cl. X.R.

75—0.5, 84

UNITED STATES PATENT OFFICE
CERTIFICATE OF CORRECTION

Patent No. 3,450,525                                       June 17, 1969

Antoine Van Den Steen

It is certified that error appears in the above identified patent and that said Letters Patent are hereby corrected as shown below:

Column 8, line 53, cancel "to"; lines 65 and 66, 71 and 72, and 75, and column 9, lines 2, 6, 11, 14, 16, and 20, cancel "into said reaction zone", each occurrence. Column 9, line 23, cancel "into the reaction zone"; line 30, "containing" should read -- contacting --.

Signed and sealed this 31st day of March 1970.

(SEAL)
Attest:

Edward M. Fletcher, Jr.                           WILLIAM E. SCHUYLER, JR.
Attesting Officer                                        Commissioner of Patents